United States Patent
Brandner et al.

(10) Patent No.: US 8,802,328 B2
(45) Date of Patent: *Aug. 12, 2014

(54) METHOD OF PRODUCING A SHAPED PART

(71) Applicant: Plansee Se, Reutte (AT)

(72) Inventors: Marco Brandner, Oy-Mittelberg (DE);
Stefan Gerzoskovitz, Lermoos (AT);
Wolfgang Kraussler, Weissenbach (AT);
Alexander Leuprecht, Weissenbach (AT); Andreas Venskutonis, Reutte (AT)

(73) Assignee: Plansee SE, Reutte (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/204,500

(22) Filed: Mar. 11, 2014

(65) Prior Publication Data

US 2014/0193287 A1 Jul. 10, 2014

Related U.S. Application Data

(63) Continuation of application No. 12/969,067, filed on Dec. 15, 2010.

(30) Foreign Application Priority Data

Dec. 15, 2009 (AT) .................... GM794/2009

(51) Int. Cl.
*H01M 8/02* (2006.01)
*B22F 3/12* (2006.01)
*B22F 5/00* (2006.01)

(52) U.S. Cl.
CPC ... *B22F 3/12* (2013.01); *B22F 5/00* (2013.01); *H01M 8/0206* (2013.01)
USPC ............................ 429/514; 429/507; 264/618

(58) Field of Classification Search
CPC ... H01M 8/021; H01M 8/0206; H01M 8/026; H01M 8/0265; H01M 8/0232; B22F 5/00; B22F 3/12
USPC .................. 429/456–458, 507, 514; 264/618; 419/10, 26, 38
See application file for complete search history.

(56) References Cited

U.S. PATENT DOCUMENTS

| | | | |
|---|---|---|---|
| 5,722,036 | A | 2/1998 | Shikata et al. |
| 7,390,456 | B2 | 6/2008 | Glatz et al. |
| 2006/0192323 | A1 | 8/2006 | Zobl et al. |
| 2008/0199738 | A1 | 8/2008 | Perry et al. |
| 2010/0021791 | A1 | 1/2010 | Hawkes et al. |

FOREIGN PATENT DOCUMENTS

| | | |
|---|---|---|
| AT | 6260 U1 | 7/2003 |
| JP | 9189321 A | 7/1997 |
| WO | 02055747 A1 | 7/2002 |

*Primary Examiner* — Milton I Cano
*Assistant Examiner* — Lilia V Nedialkova
(74) *Attorney, Agent, or Firm* — Laurence A. Greenberg; Werner H. Stemer; Ralph E. Locher

(57) ABSTRACT

A shaped part that is particularly suited as an interconnector or an end plate for a fuel cell stack, is produced by pressing and sintering a pulverulent starting material. The shaped part has a basic body with a multiplicity of knob-like and/or ridge-like elevations with a height h. Each elevation has two inclined side flanks which lead, proceeding from an end contour of the elevation, via rounded corner portions, directly or via intermediate rectilinear portions, into curved portions with a radius R or R', which in turn merge into the surface contour, of the basic body. A ratio of the radius R:h or R':h ranges from 0.25, or preferably from 0.5 to 1.

11 Claims, 2 Drawing Sheets

METHOD OF PRODUCING A SHAPED PART

CROSS-REFERENCE TO RELATED APPLICATION

This is a continuation, under 35 U.S.C. §120, of copending patent application Ser. No. 12/969,067, filed Dec. 15, 2010; the application further claims the priority, under 35 U.S.C. §119, of Austrian application GM 794/2009, filed Dec. 15, 2009; the prior applications are herewith incorporated by reference in their entirety.

BACKGROUND OF THE INVENTION

1. Field of the Invention

A shaped part which is produced by pressing and sintering a pulverulent starting material and consists of a disc-shaped or plate-shaped basic body having a multiplicity of knob-like and/or ridge-like elevations with a height h and with in each case, in cross section, two inclined side flanks which lead, proceeding from an end contour of the elevation, via rounded corner portions with a radius r or r' directly or via intermediate rectilinear portions into curved portions with a radius R or R', which merge into the surface contour of the basic body, wherein the rectilinear portions or, in the case of a direct transition of the rounded corner portions into the curved portions, the tangents at the point of the transition, have an angle of inclination $\alpha$ or $\alpha'$ with respect to the surface contour in the range of 95° to 135°.

A shaped part of this type in the form of an interconnector or of an end plate for a fuel cell stack is described, for example, in patent application publication US 2008/0199738 and in the commonly assigned Austrian utility model AT GM 6 260.

Interconnectors or end plates in a fuel cell stack have the function of current collectors and have to simultaneously ensure reliable separation of the reaction gases between the anode side and the cathode side and also the conduction of these reaction gases. In order to achieve this object, the interconnectors or end plates are designed as metallic plates or discs having knob-like and/or ridge-like elevations. These elevations are formed on one side of the basic body in the case of end plates and on both sides of the basic body in the case of interconnectors. The overall thickness of such interconnectors and end plates is in practice between 1 and 5 mm. The elevated structures are electrical contact regions with the electrochemically active cell. The interstices between the individual knob-like and ridge-like elevations then serve for conduction of the reaction gases. Overall, the interconnector or the end plate has to have a high degree of sealing over the entire dimensions, in order to ensure the reliable separation of the reaction gases between the anode side and the cathode side.

The production of the final shape of such interconnectors and end plates by a material-removing machining process from semifinished product is very costly, and therefore it is necessary to strive for production by powder metallurgy. This is done by pressing pulverulent starting materials as far as possible into final shape and then sintering the pressed shaped parts.

Inherently rectangular cross sections would be optimal for the geometric form of the cross sections for the gas conduction, since these form a good compromise in terms of maximum contacting area while providing, at the same time, a sufficiently large cross section for the gas conduction. However, such shapes cannot be produced in practice by powder metallurgy. Accordingly, in practice trapezoidal cross sections having rectilinear, inclined flanks and small transition radii both between the end contours of the elevations and the inclined flanks and between these and the surface contour of the basic body have become established.

A further problem with production by a powder metallurgy process is that alloys having high chromium contents are frequently used as the material, particularly in the case of interconnectors and end plates which are used in oxide-ceramic high-temperature fuel cell stacks (solid oxide fuel cell or SOFC). However, alloys of this type are extremely brittle at low temperatures and can only be pressed with great difficulty.

In order to ensure sufficient density and homogeneity of the finished interconnectors and end plates despite these poor pressing properties, the above-mentioned Austrian utility model AT GM 6 260 proposes a two-stage pressing process under very specific conditions. The corresponding pressing process is costly and the homogeneity of the component which is achieved is still not optimal.

SUMMARY OF THE INVENTION

It is accordingly an object of the invention to provide a shaped part which overcomes the above-mentioned disadvantages of the heretofore-known devices and methods of this general type and which provides for a complex, structured shaped part, in particular an interconnector or an end plate for a fuel cell stack, which is produced by pressing and sintering, can be produced at low cost and, at the same time, has a high density combined with the greatest possible homogeneity.

With the foregoing and other objects in view there is provided, in accordance with the invention, a shaped part produced by pressing and sintering a pulverulent starting material, the shaped part comprising:

a basic body formed with a multiplicity of elevations and a surface contour between the elevations;

the elevations having a height h from the surface contour of the basic body to an end contour of the elevations, each of the elevations, in cross section, having two inclined side flanks extending from the end contour of the elevation, via rounded corner portions having a radius r and r', respectively, into curved portions having a radius R and R', respectively, with a transition therebetween having a tangent with an angle of inclination $\alpha$ and $\alpha'$, respectively, with regard to the surface contour lying in a range of 95° to 135°, and the curved portions merging into the surface contour of the basic body;

the radius R and R' lying in a range from 0.15 to 1 mm and the height h being dimensioned such that a ratio R:h and a ratio R':h lies in a range of 0.25 to 1.

In other words, the objects of the invention are achieved in that the radius R or R' is in the range of 0.15 to 1 mm and the height h is dimensioned such that the ratio R:h or R':h is in a range of 0.25 to 1.

By virtue of the invention, it has surprisingly been realized that a very high density with relatively low density gradients and therefore a very uniform homogeneity of the shaped part are also achieved by virtue of a single-stage pressing process in the event that the transition radii of the inclined side flanks toward the basic body of the shaped part are enlarged, with the height h of the ridge-like or knob-like elevations simultaneously being reduced within a very specific range, during the production of the shaped part. The transition radius r or r' of the end contours of the elevations to the inclined side surfaces is not so significant here; in practice, it will be in a range between 0.1 and 0.5 mm. At the same time, the configuration according to the invention has positive effects on the dimensional stability and planarity of the shaped part during the subsequent process steps.

If the shaped part is designed outside the limits defined according to the invention, the density and homogeneity decrease significantly, and therefore it is no longer ensured that the shaped part can be produced by a single-stage pressing process.

In a preferred embodiment of the invention, the angle of inclination $\alpha$ or $\alpha'$ is in the range of 95° to 120°, the radius R or R' is in the range of 0.3 to 1 mm and the ratio R:h or R':h is in a range of 0.5 to 1.

Under these conditions, very good values are obtained in terms of the density and homogeneity of the shaped part.

In a particularly preferred configuration of the invention, the angle of inclination $\alpha$ or $\alpha'$ is in the range of 95° to 110°, the radius R or R' is in the range of 0.3 to 1 mm and the ratio R:h or R':h is in a range of 0.7 to 1.

Under these conditions, the best values are obtained in terms of the density and homogeneity of the shaped part.

It is particularly advantageous if the configuration of a shaped part according to the invention is used for interconnectors or end plates of fuel cell stacks. In this case, the degree of sealing of the component required for interconnectors and end plates for the reliable gas separation is also ensured, by the high achievable density of the shaped part, if an inexpensive production process is employed.

Furthermore, the configuration of the shaped part according to the invention is particularly advantageous if the pulverulent starting material used is an alloy having a chromium content of at least 20% by weight, in the case of interconnectors and end plates in particular an alloy comprising 20 to 30% by weight chromium and 70 to 80% by weight of a prealloy of iron comprising 0.5 to 0.8% by weight rare earth metals, in particular yttrium, or an alloy comprising 95% by weight chromium and 5% by weight of a prealloy of iron comprising 0.5 to 0.8% by weight yttrium.

Other features which are considered as characteristic for the invention are set forth in the appended claims.

Although the invention is illustrated and described herein as embodied in a shaped part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The simulation calculations for investigating the compaction properties for the interconnector according to the invention and for the interconnector according to the prior art were carried out by FEM (Finite Element Method) simulation with the aid of the Drucker-Prager Cap model. The basic data used for both simulations were the characteristic values of the starting powder of an alloy comprising 95% by weight chromium and 5% by weight of a prealloy of iron comprising 0.8% by weight yttrium, such as cohesion and angle of internal friction, and also the kinematic description of the pressing operation, which were the same for both simulations.

In addition, the different geometrical configuration features according to the following table were used.

| Configuration feature | Invention (FIG. 1) | Prior art (FIG. 2) |
| --- | --- | --- |
| r | 0.05 mm | 0.05 mm |
| R | 0.35 mm | 0.01 mm |
| h | 0.4 mm | 0.6 mm (top side) |
|  |  | 0.5 mm (bottom side) |
| D | 2.5 mm | 2.5 mm |
| R:h | 0.875 | 0.017 (top side) |
|  |  | 0.020 (bottom side) |
| $\alpha$ | 95° | 135° |

Figure 1:
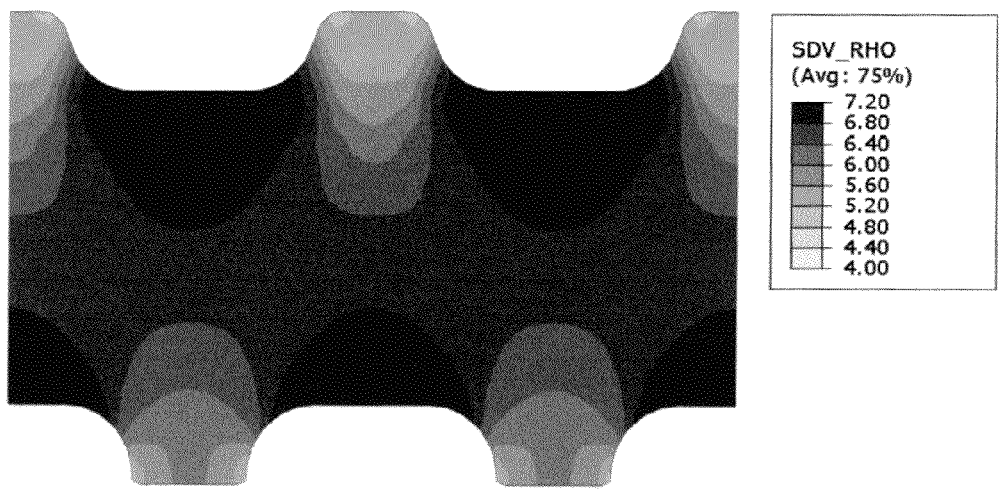
FIG. 1 shows the density distribution of interconnector according to the invention, which was determined by a simulation calculation.
Figure 2:
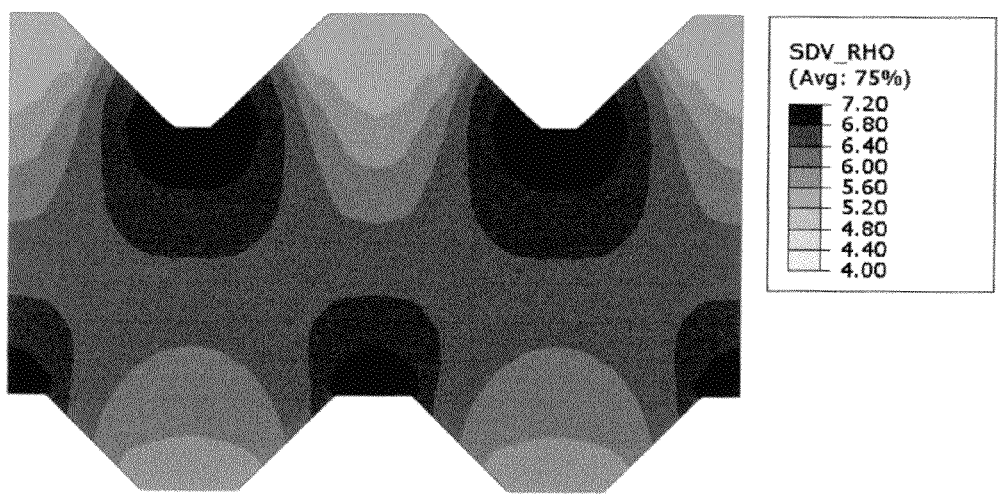
FIG. 2 shows the density distribution of interconnector according to the prior art, which was likewise determined by a simulation calculation.

The simulation results obtained were then shown with an identical grey scale in FIG. 1 and FIG. 2. The comparison shows that the geometry according to the invention, as shown in FIG. 1, has a higher pressed density in the unstructured basic body than the geometry according to the prior art, as shown in FIG. 2.

The regions of particularly high density close to the base of the channel are likewise larger for the geometry according to the invention than for the prior art. There is therefore firstly an increased absolute pressed density in the entire region of the basic body of the geometry according to the invention, and this results in an improvement in the degree of gas-tightness. On the other hand, the density gradient is very low over wide regions of the basic body, and this reduces the tendency for a curvature to be formed in the subsequent process steps, for example the sintering process.

The results clearly show that it is possible to achieve a significant increase in the pressed density and also the density homogeneity in the basic body of an interconnector by virtue of the geometry according to the invention. The geometry according to the invention therefore improves the degree of gas-tightness of the overall component, without being reliant upon a two-stage pressing process.

Figure 3:
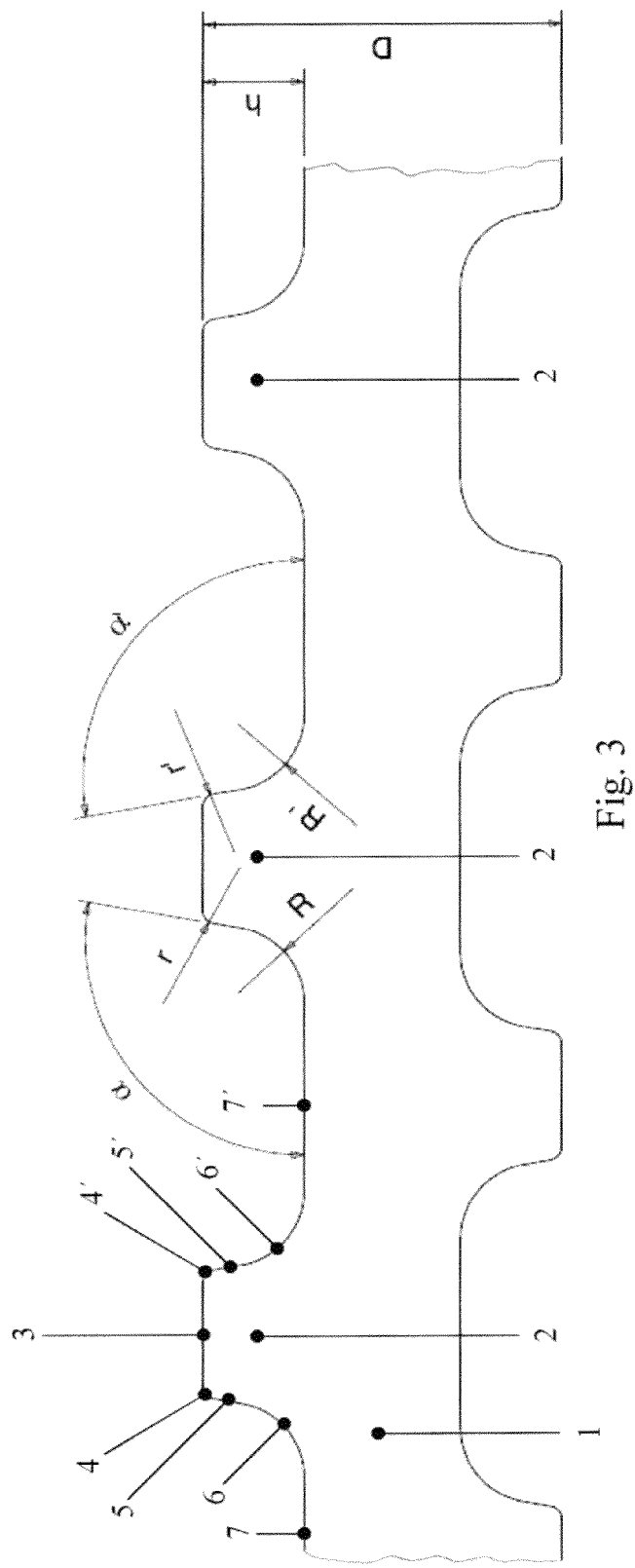
FIG. 3 is a schematic of an enlarged section detail of an interconnector according to the invention for a fuel cell stack.

FIG. 3 schematically shows, on an enlarged scale and in section, a detail of an interconnector according to the invention for a fuel cell stack. The interconnector has a plate-shaped basic body 1 with elevations 2 on both sides. The sectionally trapezoidal elevations 2 with the height h, which can be formed in a knob-like manner, in a continuously ridge-like manner or else in a ridge-like manner in segments over the entire extent of the interconnector, form, by virtue of their interstices, the channels for the gas conduction of the interconnector. The end contour 3 of each elevation 2 merges via rounded corner portions 4 or 4' with a radius r or r' into inclined side flanks with a rectilinear portion 5 or 5'. The rectilinear portions 5 or 5' then merge into curved portions 6 or 6' with a radius R or R'. These then in turn merge, without interruption, into the surface contour 7 or 7' of the basic body 1. The inclined side surfaces include an angle $\alpha$ or $\alpha'$ with the surface contour 7 or 7' of the basic body 1. It would likewise be conceivable for the rounded corner portions 4 or 4' to lead directly without the intermediate rectilinear portions 5 or 5' into the curved portions 6 or 6' if there are curved portions 6 or 6' having very large radii R or R' and small height dimensions h of the elevations 2. In this case, the tangents at the transitions of the rounded corner portions 4 or 4' into the curved portions 6 or 6' include the angle of inclination α or α' with the surface contour 7 or 7' of the basic body 1.

Figure 4:
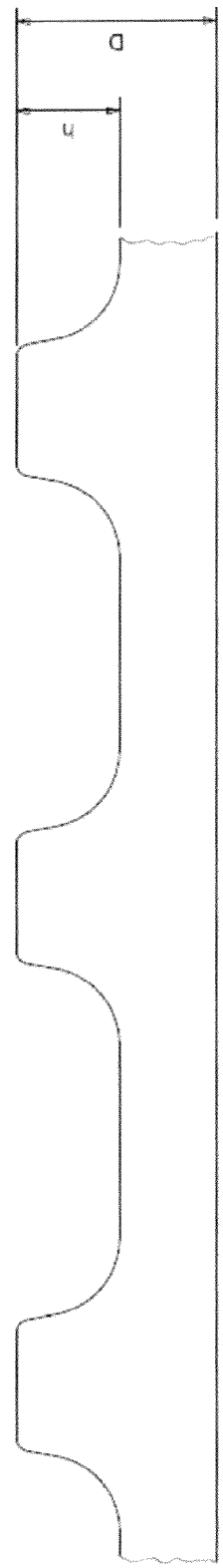
FIG. 4 is a schematic of an enlarged section detail of an end plate according to the invention for a fuel cell stack.

FIG. 4 schematically shows, on an enlarged scale and in section, the detail of an end plate according to the invention for a fuel cell stack. The elevations are formed just the same as for the interconnector shown in FIG. 3; but in contrast thereto only on one side of the basic body.

The invention claimed is:

1. A method of producing a shaped part, the method comprising:
    providing a pulverulent starting material containing at least 20% by weight chromium;
    providing a press mold having a mold shape substantially corresponding to a final shape of the shaped part, the shaped part having a disc-shaped or plate-shaped basic body formed with a multiplicity of elevations selected from the group consisting of knob-shaped and ridge-shaped elevations and a surface contour between the elevations;
    filling the starting material into the mold having the mold shape substantially corresponding to the final shape of the shaped part and pressing the starting material substantially into the final shape of the shaped part; and
    subsequently sintering the shaped part;
    defining the final shape with the elevations having a height h from the surface contour of the basic body to an end contour of the elevations, each of the elevations, in cross section, having two inclined side flanks extending from the end contour of the elevation, via rounded corner portions, into curved portions having a radius R and R', respectively, and merging into the surface contour of the basic body; and
    the radius R and R' lying in a range from 0.15 to 1 mm and a ratio of the radius R and R' to the height h (R:h, R':h) lying in a range from 0.5 to 1.

2. The method according to claim 1, which comprises dimensioning the mold so that the rounded corner portions transition directly into the curved portions.

3. The method according to claim 1, which comprises dimensioning the mold so that the rounded corner portions are connected to the curved portions via intermediate rectilinear portions having an angle of inclination α and α', respectively, with regard to the surface contour in a range of 95° to 135°.

4. The method according to claim 3, which comprises setting the angle of inclination α, α' within a range of 95° to 120°.

5. The method according to claim 1, which comprises setting the radius R or R' within a range of 0.3 to 1 mm.

6. The method according to claim 3, which comprises setting the angle of inclination α, α' within a range of 95° to 110°.

7. The method according to claim 1, which comprises setting the radius R or R' within a range of 0.3 to 1 mm, and setting the ratio R:h or R':h within a range of 0.7 to 1.

8. The method according to claim 1, which comprises setting processing parameters relating to the starting material, the press mold, the single pressing and the sintering to form a shaped part suitable as an interconnector or an end plate of a fuel cell stack.

9. The method according to claim 1, which comprises providing the pulverulent starting material containing chromium, iron, and at least one rare earth metal.

10. The method according to claim 9, which comprises providing the pulverulent starting material containing 20 to 30% by weight chromium and 70 to 80% by weight iron with 0.5 to 0.8% by weight of the at least one rare earth metal.

11. The method according to claim 9, wherein the rare earth metal is yttrium.

* * * * *